United States Patent
Bassov et al.

(10) Patent No.: US 10,761,756 B1
(45) Date of Patent: Sep. 1, 2020

(54) COMPRESSING DATA IN LINE USING WEIGHTED COMPRESSION BUDGETS

(71) Applicant: EMC IP Holding Company LLC, Hopkinton, MA (US)

(72) Inventors: Ivan Bassov, Brookline, MA (US); Philippe Armangau, Acton, MA (US); Yining Si, Shrewsbury, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 744 days.

(21) Appl. No.: 15/392,639

(22) Filed: Dec. 28, 2016

(51) Int. Cl.
*G06F 3/06* (2006.01)
(52) U.S. Cl.
CPC ............ *G06F 3/064* (2013.01); *G06F 3/0608* (2013.01); *G06F 3/0643* (2013.01); *G06F 3/0683* (2013.01)
(58) Field of Classification Search
CPC ...... G06F 3/064; G06F 3/0608; G06F 3/0643; G06F 3/0683
See application file for complete search history.

(56) References Cited

U.S. PATENT DOCUMENTS

| | | | |
|---|---|---|---|
| 5,675,789 A * | 10/1997 | Ishii .................. | G06F 3/0601 |
| 5,701,516 A | 12/1997 | Cheng et al. | |
| 8,190,850 B1 | 5/2012 | Davenport et al. | |
| 2015/0088945 A1* | 3/2015 | Kruus .................. | H03M 7/30 |
| | | | 708/203 |
| 2015/0178013 A1* | 6/2015 | Rostoker ............... | G06F 3/0608 |
| | | | 711/115 |
| 2019/0058597 A1* | 2/2019 | Lim ........................ | G06F 21/55 |

OTHER PUBLICATIONS

Yannis Klonatos et al., "Transparent Online Storage Compression at the Block-Level", ACM Transactions on Storage, May 2012, 33 pages, vol. 8, No. 2, Article 5.

* cited by examiner

*Primary Examiner* — William B Partridge
*Assistant Examiner* — Eric T Loonan
(74) *Attorney, Agent, or Firm* — BainwoodHuang (57) ABSTRACT

A technique for performing in-line compression includes receiving data into a data log that temporarily holds the data and aggregating the data into batches, where each batch includes multiple blocks of received data. For each batch of data, a storage system performs a compression operation, which proceeds block-by-block, compressing each block and comparing a total compressed size of all blocks compressed so far against a budget. The storage system increments the budget for successive blocks, such that a per-block budget is greater for a first block in the batch than it is for a last block in the batch, thus allowing earlier blocks to meet budget even if they are relatively incompressible.

16 Claims, 4 Drawing Sheets

COMPRESSING DATA IN LINE USING WEIGHTED COMPRESSION BUDGETS

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Some data storage systems employ data compression to improve storage efficiency. For example, a software program running on a data storage system may read data from disk, compress the data, and write the compressed data back to disk. To read data that has been compressed, the program may work in the opposite direction, e.g., by fetching compressed data from disk, decompressing the data, and presenting the decompressed data to a requesting program.

SUMMARY

Data storage systems that employ compression generally do so in the background, such as by running a background process or daemon that acts upon already-stored data. Performing compression in the background may result in an over-commitment of storage resources, however, as more storage space than necessary may be required to accommodate initial writes. Also, background compression may entail reading previously-written data from persistent storage and rewriting compressed data back to persistent storage, resulting in a significant increase in disk traffic.

Recent improvements in data storage systems perform data compression in line with storage requests, such that incoming data are compressed prior to the first time they are stored on disk. This arrangement helps to avoid over-commitment of storage resources and to avoid increases in disk traffic.

As in-line compression takes place in real time, or nearly so, there is a need for in-line compression to proceed quickly and efficiently, so as not to interfere with other real-time activities. One approach has been to cache incoming data and to compress the data in batches of several blocks each. A storage system compresses a first block in the batch and tests the compressed block to determine whether its compressed size falls within an initial budgeted size. If it does, the storage system proceeds to the next block in the batch and repeats the same activities, doubling the budgeted size and confirming that both compressed blocks together fall within the new budgeted size. Operation proceeds in this fashion, with additional blocks being compressed and the total compressed size being tested against an increasing budget, with the budget increasing for each block as a multiple of the initial budgeted size.

The above-described approach can be improved, however, by allowing earlier-tested blocks in a batch to compress to larger sizes than the prior budgeting arrangement would allow, as long as all blocks in the batch can be compressed to a target size for the batch as a whole. For example, an improved technique for performing in-line compression includes receiving data into a data log that temporarily holds the data and aggregating the data into batches, where each batch includes multiple blocks of received data. For each batch of data, the data storage system performs a compression operation, which proceeds block-by-block, compressing each block and comparing a total compressed size of all blocks compressed so far against a budget. The storage system increments the budget for successive blocks, but the amount of budget per-block is larger for a first block in the batch than it is for a later block in the batch. In this manner, the storage system is made less sensitive to compressibility of initial blocks in a batch, allowing the batch as a whole to be compressed and stored in compressed form even if initial blocks in the batch are relatively incompressible. The improved technique therefore enables more data to be compressed in line than did the prior technique, without sacrificing the efficiency of real-time activities.

Certain embodiments are directed to a method of storing data. The method includes receiving data into a data log of a data storage system, the data log providing temporary storage for the data in units of blocks, aggregating blocks of the data in the data log into multiple batches, each batch including multiple blocks, and performing a compression operation on each batch. Performing the compression operation on each batch includes processing a current block in the batch by (i) compressing the current block and (ii) performing a testing operation for the current block. The testing operation is configured to (a) produce a first result in response to determining that an accumulated compressed size of all compressed blocks in the batch processed so far exceeds a compression budget and (b) produce a second result in response to determining that the accumulated compressed size of all compressed blocks in the batch processed so far does not exceed the compression budget. The compression operation proceeds to a next block in the batch in response to the testing operation producing the second result for the current block. Increasing the compression budget is performed such that a per-block value of the compression budget is greater when testing a first block in the batch than it is when testing a later block in the batch. In response to the testing operation producing the second result for all blocks in a batch, the method still further includes storing the data of all blocks in the batch in compressed form in a set of non-volatile storage devices of the data storage system.

Other embodiments are directed to a data storage system constructed and arranged to perform a method of storing data, such as the method described above. Still other embodiments are directed to a computer program product. The computer program product stores instructions which, when executed on control circuitry of a data storage system, cause the data storage system to perform a method of storing data, such as the method described above.

The foregoing summary is presented for illustrative purposes to assist the reader in readily grasping example features presented herein; however, the foregoing summary is not intended to set forth required elements or to limit embodiments hereof in any way. One should appreciate that the features described above can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for performing in-line compression includes receiving data into a data log and aggregating the data into batches, where each batch includes multiple blocks of received data. For each batch, the data storage system performs a compression operation, which proceeds block-by-block, compressing each block and comparing a total compressed size against a budget. The storage system increases the budget for successive blocks, but does so such that the budget per block for successive blocks decreases. In this manner, the storage system is made less sensitive to incompressibility of initial blocks in a batch.

Figure 1:
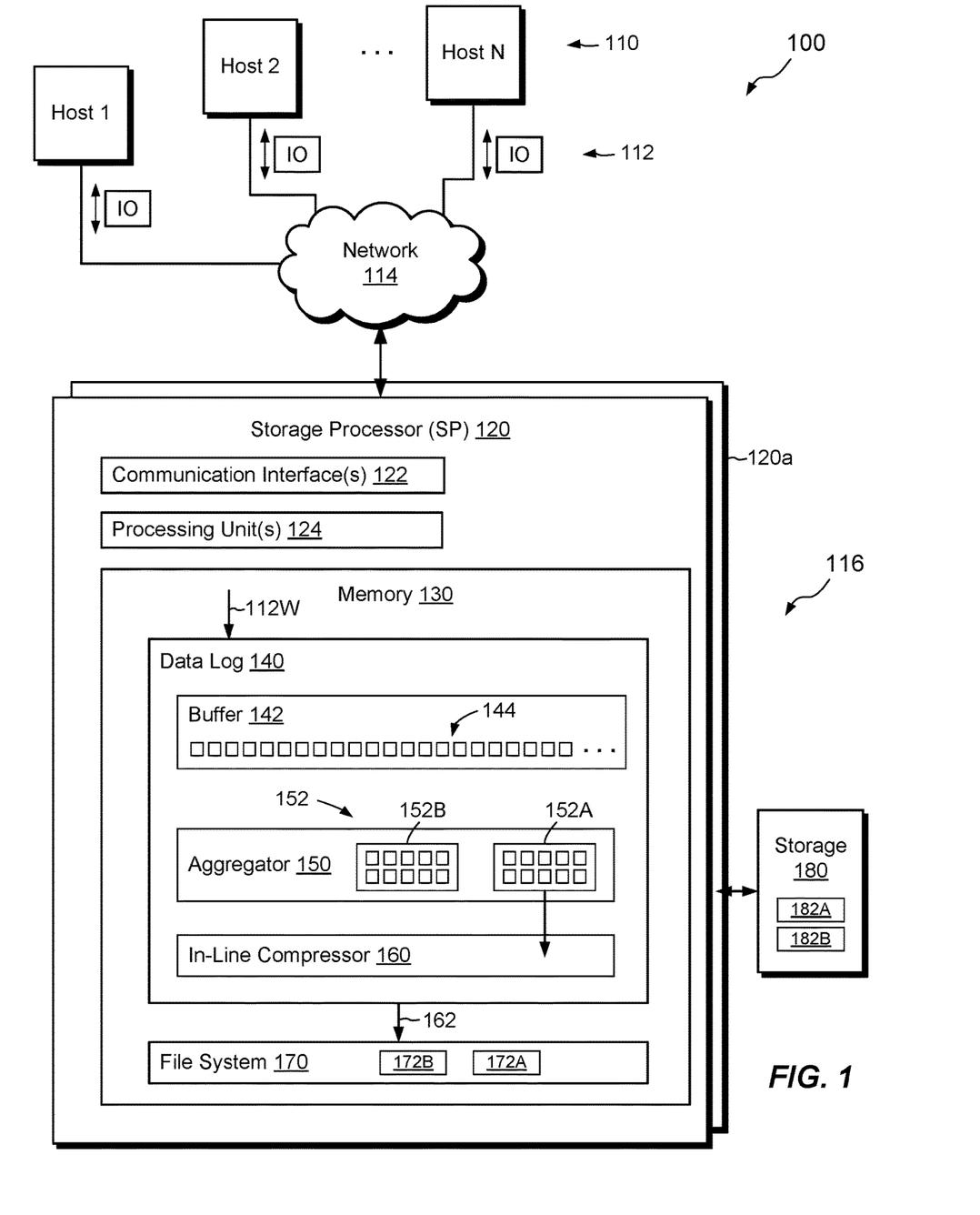
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110 access a data storage system 116 over a network 114. The data storage system 116 includes a storage processor, or "SP," 120 and storage 180. In an example, the storage 180 includes multiple disk drives, such as magnetic disk drives, electronic flash drives, optical drives, and/or other types of drives.

The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs may be provided, including a single SP, and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI, NFS, and CIFS, for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 according to block-based and/or file-based protocols and to respond to such IO requests 112 by reading or writing the storage 180.

The SP 120 includes one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by operation of software instructions, a data log 140 and a file system 170. The data log 140 includes a buffer 142, an aggregator 150, and an in-line compressor 160.

In example operation, hosts 110 issue IO requests 112 to the data storage system 116 to perform reads and writes of one or more data objects stored in the data storage system 116. SP 120 receives the IO requests 112 at communication interface(s) 122 and passes them to memory 130 for further processing. Some of the IO requests 112 specify data writes 112W. Data log 140 receives data writes 112W and stores data specified therein in blocks 144 of buffer 142. In an example, blocks 144 are storage units of uniform size, such as 4 KB, 8 KB, and so forth. In a further example, the size of blocks 144 may correspond to the size of allocation units (AUs) of the file system 170, where an AU is the smallest unit of storage that the file system 170 can allocate. In some examples, buffer 142 is arranged as a circular buffer having a head and a tail (not shown). The data log 140 may append blocks 144 of data specified by newly-arriving write requests 112W to the head of buffer 142 and may flush blocks 144 from the tail of buffer 142, for further processing by the file system 170. A flushing operation 162 is illustrated.

In an example, the buffer 142 is implemented in DRAM (Dynamic Random Access Memory), the contents of which are mirrored between SPs 120 and 120a and persisted using batteries. In an example, SP 120 may acknowledge writes 112W back to originating hosts 110 once the data specified in those writes 112W are stored in the buffer 142 and mirrored to a similar buffer on SP 120a.

As the buffer 142 of data log 140 accumulates data in blocks 144, aggregator 150 assembles blocks 144 in batches 152. Two batches 152A and 152B are shown, each having ten blocks. However, batches may include other numbers of blocks and different batches may include different numbers of blocks.

In-line compressor 160 accesses batches 152 from aggregator 150 and performs a compression operation on each batch 152. For example, each compression operation compresses a first block 144 in the batch 152 and tests the resulting compressed block to determine whether its compressed size falls within a budgeted size. If it does, the in-line compressor 160 proceeds to the next block in the batch 152 and repeats the same activities, increasing the budgeted size and confirming that both compressed blocks together fall within the new budgeted size. Operation proceeds in this fashion, with additional blocks 144 being compressed and the total compressed size being tested against the increasing budget. However, the budget increases non-uniformly, by smaller amounts each time it is increased. Thus, for example, the budget may start out relatively large for the first block but may increase by smaller amounts for each successive block. By the time later blocks in the batch are tested, the per-block budget has become smaller than it was for the first block. This arrangement allows earlier-tested blocks to be poorly compressible without exceeding the budget.

In some examples, the in-line compressor 160 is configured to flush data from the data log 140 to the file system 170 in batches 152, with each batch 152 either being entirely compressed or not being compressed at all. For example, the in-line compressor 160 may flush batch 152A entirely in compressed form, but only if all blocks of batch 152A compress within budget. Likewise, the in-line compressor 160 may flush batch 152B entirely in uncompressed form, even if only a single block of batch 152B fails to compress within budget. As further shown in FIG. 1, the file system 170 stores compressed batch 152A in storage region 172A and stores uncompressed batch 152B in storage region 172B. These regions 172A and 172B are backed by physical storage 180 at locations 182A and 182B, respectively.

As entire batches 152 may be flushed either all-compressed or all-uncompressed, the benefits of providing additional budget for initial blocks in a batch 152 can plainly be seen, as batches with one or two early incompressible blocks can still be candidates for compressed flushing. Entire batches 152, which might otherwise be abandoned and left uncompressed, can thus be flushed in compressed form and stored in compressed form, provided that later blocks in those batches are compressible enough that the batches as a whole are able to meet budget.

In some examples, aggregator 150 assembles batches 152 based at least in part on data objects. For example, buffer 142 may accumulate writes that are directed to multiple data objects hosted by the data storage system 116. By aggregating based on data objects, the aggregator 150 tends to group together like types of data in respective batches 152. Aggregating based on data objects thus tends to promote consistency in data within each batch 152, as all the data in each batch 152 belongs to the same data object. Consistency in data suggests consistency in compressibility, and this provides a basis for the in-line compressor 160 to terminate compression of an entire batch based on a failure to meet budget in response to testing any of its blocks.

In some examples, aggregator 150 also assembles batches 152 based on logical address into a data object. As is known, data objects have logical address ranges. For example, a file has a logical address range that defines different offsets into the file. Also, a LUN (Logical UNit) may have a logical address range that specifies offsets from a starting point. By aggregating based on logical address, the aggregator 150 still further tends to group together like types of data in respective batches 152.

Figure 2:
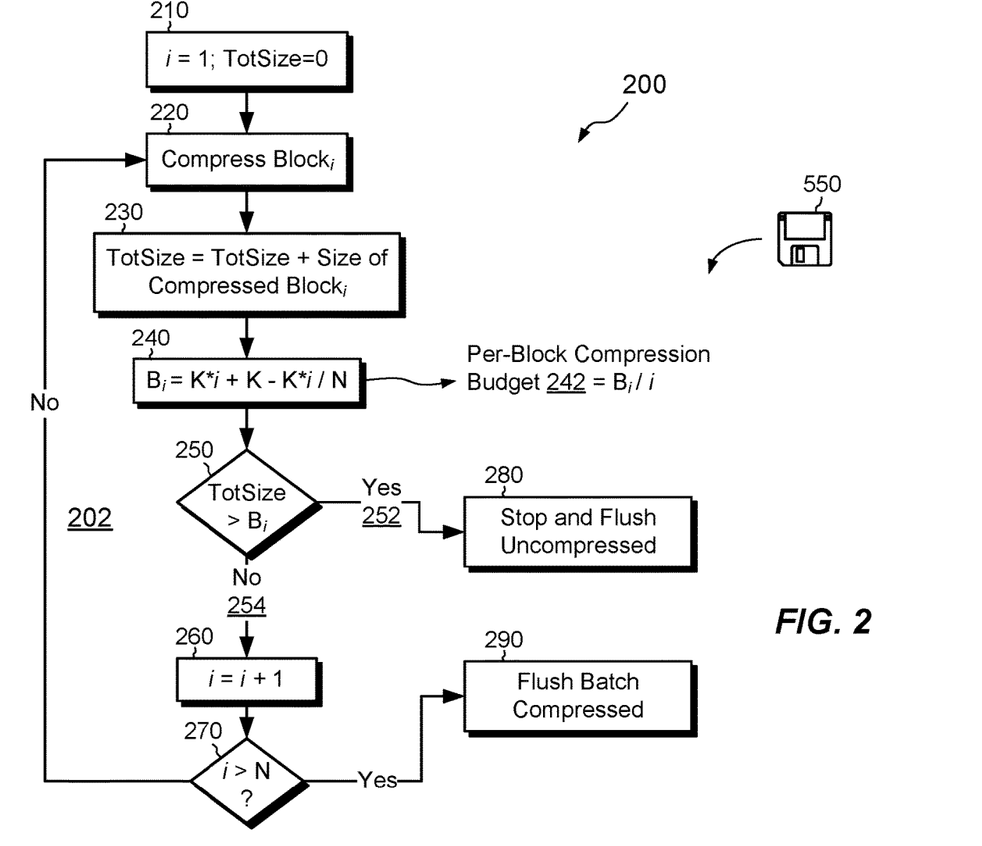
FIG. 2 is a flowchart of an example method of performing a compression operation on a batch of blocks that contain received data.

FIG. 2 shows an example compression 200 operation on a batch 152 of blocks 144. In an example, the compression operation 200 is performed by the in-line compressor 160 and may be repeated for each batch 152 of blocks 144 aggregated by aggregator 150. The particular acts of the compression operation 200 may be ordered in any suitable way, including performing some acts simultaneously.

At 210, an index variable (i) may be set to one and a total size of all compressed blocks in the current batch 152 (TotSize) may be set to zero. Other implementations may initialize these terms to different values or may use different terms.

At 220, a first block 144 (Block$_i$) in the batch 152 is compressed. Blocks 144 in batch 152 may be compressed in any order. No special significance is implied by a block being selected as the first block; rather, the first block may be any block 144 in the batch 152.

At 230, the compressed size of Block$_i$ is added to TotSize. For example, if Block$_i$ is initially 8 KB and Block$_i$ compresses down to 7 KB, then the compressed size of Block$_i$ would be 7 KB and TotSize would initially be 7 KB.

At 240, a compression budget $B_i$ is generated for the current value of i. In the example, shown, the current budget $B_i$=K*i+K−K*i/N, where N is the number of blocks 144 in the current batch 152 and K is a constant equal to a maximum allowed compression ratio for the current batch as a whole. For example, K=0.75 means that the total maximum compression ratio of the batch, assuming all blocks are compressed, must not exceed 75% of the initial, uncompressed size of that batch. As a further example, assume that the current batch has ten blocks (N=10), each being 8 KB in size, and that K=0.75. With these example figures, the overall budget for the batch, assuming that operation proceeds that far, would be 0.75*8 KB*10, or 61,440 bytes. As shown at 240, the budget $B_i$ is updated for each value of i (i.e., for each iteration of loop 202).

Act 250 designates a testing operation, in which the current TotSize is compared to the current budget $B_i$. If TotSize exceeds the current budget, the testing operation produces a first value 252 (Yes). If TotSize is less than or equal to the current budget, the testing operation produces a second value 254 (No).

If the testing operation produces the second value 254, operation proceeds to 260, where i is incremented for the next iteration of the loop 202. If incrementing i would cause i to exceed N (at 270), the compression operation 200 completes and, at 290, the compressed blocks in the current batch are flushed from the data log 140, e.g., to the file system 170 (FIG. 1), where the compressed blocks are eventually placed in storage 180, e.g., at location 182A. Otherwise, operation returns to 220, where a next block 144 in the current batch 152 is compressed and the above-described acts are repeated.

For any iteration of the loop 202, if the testing operation at 250 produces the first value 252, indicating that the current budget $B_i$ has been exceeded, operation proceeds to 280, whereupon the compression operation 200 may be terminated for the current batch, e.g., without compressing or testing any remaining blocks in the batch. The data log 140 may then flush the current batch, e.g., entirely in uncompressed form, to the file system 170, where the uncompressed data are eventually placed in storage 180, e.g., at location 182B.

One should appreciate that particular acts of compression operation 200 may be varied in different embodiments. For example, the calculation of the current budget at 240 may be performed in a variety of ways. For instance, the budget $B_i$ may be calculated using a logarithmic function, a pseudo-logarithmic function, using a differently-weighted formula, a series of predetermined values, or any other method that provides a greater amount of budget per block for earlier-compressed blocks than for later-compressed blocks in a batch. A per-block compression budget 242 may be provided as $B_i/i$. A minimum requirement for any calculation of $B_i$ should ensure that per-block compression budget 242 is greater for the first block 144 in a batch than it would be for the last block in that batch. In addition, while the illustrated embodiment updates $B_i$ for each iteration through the loop 202, the compression operation 200 may alternatively update $B_i$ on some other basis, such as for every second block, every third block, or even at non-uniform intervals.

In some examples, upon reaching step 280, the data log 140 may salvage already-compressed blocks in the current batch, even though compression does not proceed to remaining blocks in the batch. For example, the data log 140 may flush already-compressed blocks in the current batch in compressed form, but may flush any remaining blocks in the batch (those which have not been compressed) in uncompressed form.

Figure 3:
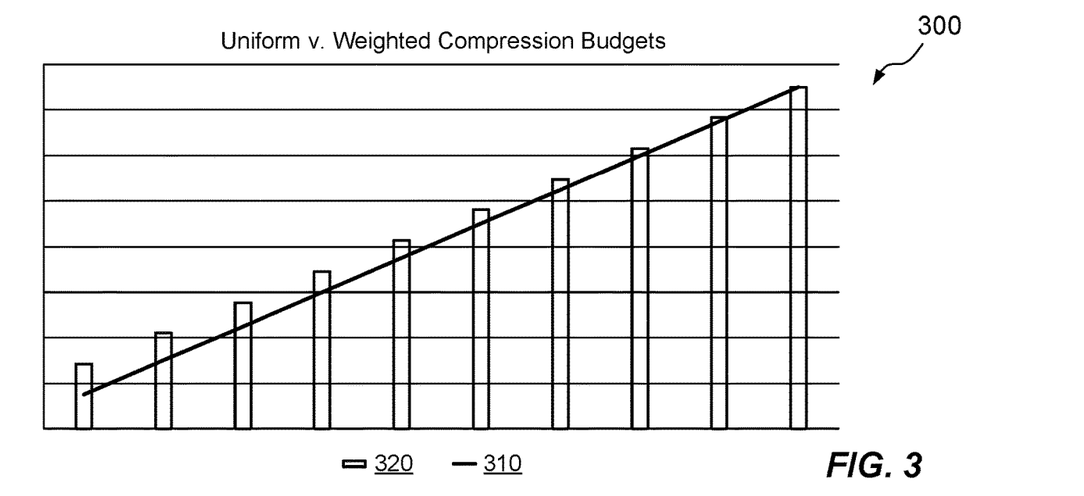
FIG. 3 is a graph comparing different example budgeting approaches for performing in-line compression in the environment of FIG. 1.

FIG. 3 shows a graph 300, which compares uniform budgets 310 with weighted budgets 320. The graph 300 illustrates block indices (e.g., value of i) along the horizontal axis and budget along the vertical axis. In the example shown, axis lines along the vertical axis indicate block-size increments of budget. For instance, the first axis line above the baseline corresponds to one block increment (e.g., 8 KB), the second axis line corresponds to two block increments (e.g., 16 KB), and so forth.

Uniform budgets 310 provide a constant amount of budget per block. For example, if the first block (i=1) has a budget of 0.75 block increments (e.g., 6 KB), then the second block (i=2) has a budget of 1.5 block increments (e.g., 12 KB). Likewise, the third block (i=3) has a budget of 2.25 block increments (e.g., 18 KB), and so on, with each i-th block having a budget of 0.75*i block increments. If the uniform budget 310 were to be used in place of the one shown in 240 of FIG. 2, then the compression operation 200 might terminate if the first or second block was relatively incompressible compared with later blocks.

In contrast, weighted budgets 320 provide additional budget (see bar graph) for initial blocks to be compressed. For instance, using the expression of act 240, a first block can actually "compress" to a larger size than it originally occupies. The weighted budget 320 is increased for each successive block, but the amount of increase is smaller each time than it was the previous time. Assuming that the compression operation 200 gets to the last block in the batch (e.g., to block 10), then the value of the weighted budget 320, which is used in the testing operation at 250, converges with the uniform budget 310 for the same block. In this example, both approaches test TotSize against a budget of 7.5 block increments (60 KB for an 8 KB block size) when testing the last block in the batch. Overall budgets for an entire batch may thus be the same for both approaches. However, the distribution of budgets in weighted budgets 320 is skewed relative to the uniform budgets 310, with additional budget being provided for early blocks to be tested and budget increases reduced for later blocks.

Figure 4:
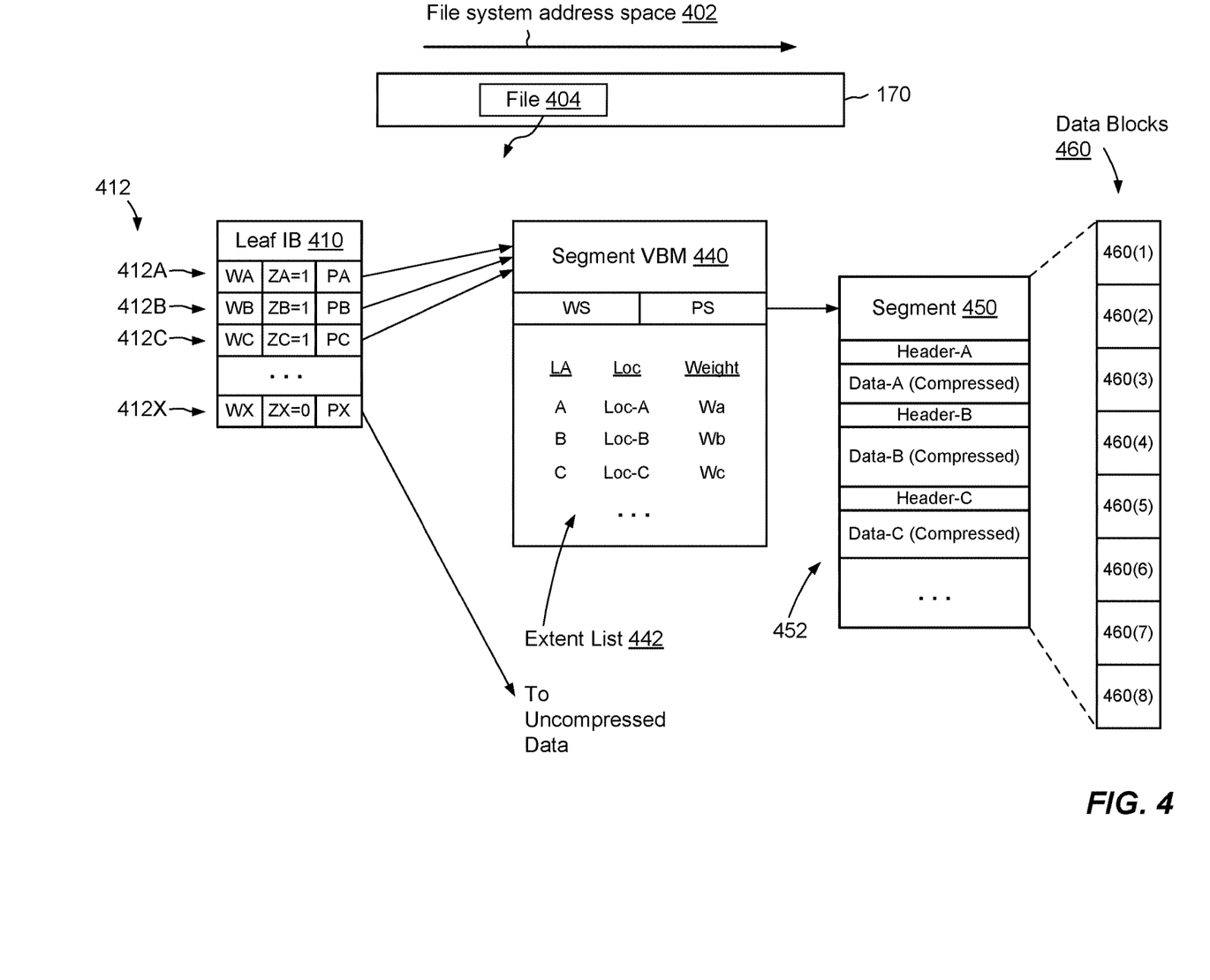
FIG. 4 is a block diagram showing an example metadata arrangement that supports storage of compressed data in a file system.

FIG. 4 shows example metadata structures that support storage of both compressed storage extents 172A and of uncompressed storage extents 172B in the file system 170. Here, a file 404 resides within the file system 170 and stores a complete realization of a data object to which write requests 112W (FIG. 1) are directed. The file 404 has a leaf D3 (Indirect Block) 410, which includes block pointers 412 that map logical addresses of the file 402 to corresponding physical addresses in the file system 170. For example, block pointer 412A maps logical address A, block pointer 412B maps logical address B, block pointer 412C maps logical address C, and block pointer 412X maps logical address X. Although only four block pointers 412 (1-3 and X) are shown, leaf D3 410 may include any number of block pointers 412, a typical number of block pointers per D3 being 1024, for example. The file 404 may have many leaf IBs, which may be arranged in an D3 tree for mapping a logical address range of the file 404 to corresponding physical addresses in the file system 170. A "physical address" is a unique address within a physical address space 402 of the file system 170. Although not shown, the file system 170 may further include an inode (index node) table, which provides a unique inode for each file in file system 170. The inode of each file provides a set of block pointers, which includes pointers to IBs. By accessing a file's inode, the file system 170 can traverse the D3 tree to access any data block storing data of that file.

Each block pointer 412 include a weight (WA, WB, WC, . . . , WX), a Z-bit (ZA, ZB, ZC, ZX) and a pointer (PA, PB, PC, . . . , PX). The weight in each block pointer 412 indicates the number of other block pointers in the file system 170 that point to that block pointer. The Z-bit indicates whether the pointed-to data is compressed, and the pointer provides a physical address to be inspected for locating the pointed-to data. The block at the indicated physical address may contain the pointed-to data itself (e.g., for uncompressed data) or it may provide a segment VBM (virtual block map) 440 (e.g., for compressed data). The segment VBM 440 points to a segment 450, which stores compressed data. In an example, segment 450 is composed of data blocks 460 (i.e., blocks 460(1) through 460(8)), which have contiguous physical addresses in the file system 400). For purposes of storing compressed data, boundaries between blocks 460(1) through 460(8) are ignored and the segment 450 is treated as one contiguous space.

The segment VBM 440 itself has a weight WS and a pointer PS. The weight WS indicates the number of block pointers (e.g., 412) that point to the segment VBM 440, and the pointer PS points to the physical address of the segment 450, which by convention may be selected to be the address of the first data block 460 (e.g., that of block 460(1)). The segment VBM 440 also includes an extent list 442. Extent list 442 describes the contents of segment 450 and relates, for each item of compressed data, the logical address of that item in the file (e.g., A, B, and C), the location (e.g., byte offset) of that data in the segment 450 (e.g., Loc-A, Loc-B, and Loc-C), and a weight (Wa, Wb, and Wc). In an example, the sum of weights of extents in the extent list 442 equals the total weight WS of the segment VBM 440.

The detail shown in segment 450 indicates an example layout 452 of data items. For instance, Header-A can be found at Loc-A and is immediately followed by compressed Data-A. Likewise, Header-B can be found at Loc-B and is immediately followed by compressed Data-B. Similarly, Header-C can be found at Loc-C and is immediately followed by compressed Data-C. In an example, each compression header is a fixed-size data structure that includes fields for specifying compression parameters, such as compression algorithm, length, CRC (cyclic redundancy check), and flags.

To place a compressed segment of file 404 in file system 170 (such as region 172A of FIG. 1), the file system 170 allocates data blocks (such as blocks 460) and writes the compressed segment to the newly-allocated blocks. The file system 170 may allocate a new segment VBM (e.g., segment VBM 440), establish its extent list 442, its pointer PS to the new data blocks, and its weight WS. The file system may also update block pointers (e.g., those in leaf D3 210) to point to the new segment VBM, marking the Z-bit of such block pointers to indicate that the pointed-to data are compressed. Although the leaf D3 210 tracks logical address ranges of file 404 in block-denominated sizes (e.g., 4 KB, 8 KB, etc.), the compressed data in blocks 460 may occupy significantly less space.

To place an uncompressed region of file 404 in file system 170 (such as region 172B of FIG. 1), the file system 170 allocates data blocks and writes the compressed segment to the newly-allocated blocks. However, there is no requirement for the blocks of uncompressed data to be contiguous in the physical address space 402. Thus, data blocks for storing uncompressed data may be located anywhere. As with block pointer 412X in leaf D3 410, the block pointers for uncompressed blocks may point to respective data blocks, which store the uncompressed data, with no requirement for any segment VBM 440. The file system 170 sets the Z-bit to of all block pointers to uncompressed blocks to indicate an uncompressed state.

Figure 5:
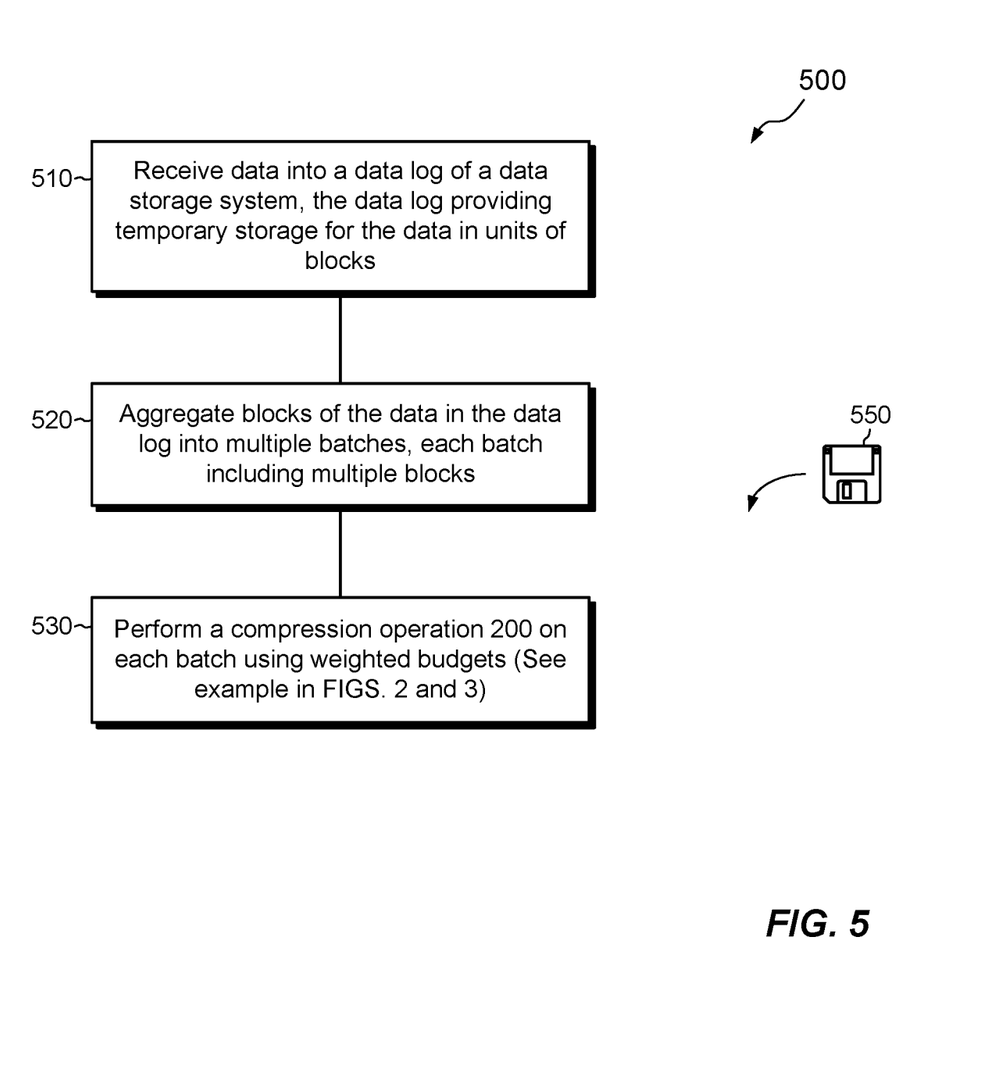
FIG. 5 is a flowchart showing an example method of storing data in accordance with embodiments hereof.

FIG. 5 shows an example method 500 that may be carried out in connection with the environment 100. The method 500 is typically performed, for example, by the software constructs described in connection with FIG. 1, which reside in the memory 130 of the storage processor 120 and are run by the set of processors 124. The various acts of method 500 may be ordered in any suitable way. Accordingly, embodiments may be constructed in which acts are performed in orders different from that illustrated, which may include performing some acts simultaneously.

At 510, the data storage system 116 receives data into a data log 140. The data log 140 provides temporary storage for the received data in units of blocks 144.

At 520, blocks 144 of data in the data log 140 are aggregated into multiple batches 152, with each batch including multiple blocks 144.

At 530, a compression operation 200, as described in connection with FIG. 2, is performed for each of the multiple batches using weighted budgets, as described in connection with FIGS. 2 and 3. In response to the testing operation producing the second result (e.g., 254) for all blocks in a batch, the data of all blocks in the batch are stored in compressed form in a set of non-volatile storage devices of the data storage system. It is not required or intended that the compression operation must be performed on every single batch 152 of aggregated blocks. For example, some implementations may omit the compression operation 200 for certain batches, e.g., if the data storage system is very busy performing other real-time tasks.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIGS. 2 and 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of storing data, the method comprising:
   receiving data into a data log of a data storage system, the data log providing temporary storage for the data in units of blocks;
   aggregating blocks of the data in the data log into multiple batches, each batch including multiple blocks;
   performing a compression operation on each batch, the compression operation including—
      processing a current block in the batch by (i) compressing the current block and (ii) performing a testing operation for the current block, the testing operation configured to (a) produce a first result in response to determining that an accumulated compressed size of all compressed blocks in the batch processed so far exceeds a compression budget and (b) produce a second result in response to determining that the accumulated compressed size of all compressed blocks in the batch processed so far does not exceed the compression budget;
      proceeding to a next block in the batch in response to the testing operation producing the second result for the current block; and
      increasing the compression budget when testing later blocks in the batch, such that a per-block value of the compression budget is greater when testing a first block in the batch than the per-block value of the compression budget is when testing a later block in the batch, the compression budget increasing in accordance with $K*i+K-K*i/N$, wherein K is a constant, i is an index of a current block being processed by the compression operation, and N is the number of blocks in the batch; and in response to the testing operation producing the second result for all blocks in a particular batch, storing the data of all blocks in the particular batch in compressed form in a set of non-volatile storage devices of the data storage system.

2. The method of claim 1, further comprising, when performing the compression operation on another batch of blocks, terminating the compression operation on the other batch of blocks in response to the testing operation producing the first result for a block in the other batch of blocks.

3. The method of claim 2, further comprising, in response to terminating the compression operation for the other batch of blocks, storing all blocks in the other batch of blocks in uncompressed form in the set of non-volatile storage devices of the data storage system.

4. The method of claim 2, wherein the compression operation for a first batch of blocks is performed before ever storing any data in that first batch of blocks in any disk drive of the data storage system.

5. The method of claim 4, wherein aggregating blocks into multiple batches includes placing together in one batch multiple blocks whose data are all directed to a same data object stored in the data storage system.

6. The method of claim 5, wherein aggregating blocks into multiple batches further includes placing together in one batch multiple blocks whose data are all directed to a same range of logical addresses in the data object.

7. The method of claim 5, further comprising, when storing compressed data of a second batch in the set of non-volatile storage devices, providing the compressed data in a segment of contiguous storage space in a file system.

8. The method of claim 7, wherein providing the compressed data in the segment of contiguous storage space in a file system includes updating a block pointer in the file system to point to the segment and to indicate in the block pointer that the block pointer points to compressed data.

9. The method of claim 1, wherein when performing the compression operation on each batch, the compression budget applies to compresses sizes of blocks in the batch.

10. A data storage system, comprising control circuitry that includes a set of processing units coupled to memory, the control circuitry constructed and arranged to:

receive data into a data log of a data storage system, the data log providing temporary storage for the data in units of blocks;

aggregate blocks of the data in the data log into multiple batches, each batch including multiple blocks;

perform a compression operation on each batch, the compression operation configured to— process a current block in the batch by (i) compressing the current block and (ii) performing a testing operation for the current block, the testing operation configured to (a) produce a first result in response to determining that an accumulated compressed size of all compressed blocks in the batch processed so far exceeds a compression budget and (b) produce a second result in response to determining that the accumulated compressed size of all compressed blocks in the batch processed so far does not exceed the compression budget;

proceed to a next block in the batch in response to the testing operation producing the second result for the current block; and increase the compression budget when testing later blocks in the batch, such that a per-block value of the compression budget is greater when testing a first block in the batch than the per-block value of the compression budget is when testing a later block in the batch, the compression budget increased in accordance with $K*i+K-K*i/N$, wherein K is a constant, i is an index of a current block being processed by the compression operation, and N is the number of blocks in the batch; and in response to the testing operation producing the second result for all blocks in a particular batch, store the data of all blocks in the particular batch in compressed form in a set of non-volatile storage devices of the data storage system.

11. A computer program product including a set of non-transitory, computer-readable media having instructions which, when executed by control circuitry of a data storage system, cause the control circuitry to perform a method for storing data, the method comprising:

receiving data into a data log of a data storage system, the data log providing temporary storage for the data in units of blocks;

aggregating blocks of the data in the data log into multiple batches, each batch including multiple blocks;

performing a compression operation on each batch, the compression operation including— processing a current block in the batch by (i) compressing the current block and (ii) performing a testing operation for the current block, the testing operation configured to (a) produce a first result in response to determining that an accumulated compressed size of all compressed blocks in the batch processed so far exceeds a compression budget and (b) produce a second result in response to determining that the accumulated compressed size of all compressed blocks in the batch processed so far does not exceed the compression budget;

proceeding to a next block in the batch in response to the testing operation producing the second result for the current block; and increasing the compression budget when testing later blocks in the batch, such that a per-block value of the compression budget is greater when testing a first block in the batch than the per-block value of the compression budget is when testing a later block in the batch, the compression budget increasing in accordance with $K*i+K-K*i/N$, wherein K is a constant, i is an index of a current block being processed by the compression operation, and N is the number of blocks in the batch; and in response to the testing operation producing the second result for all blocks in a particular batch, storing the data of all blocks in the particular batch in compressed form in a set of non-volatile storage devices of the data storage system.

12. The computer program product of claim 11, wherein the compression operation for a first batch of blocks is performed before ever storing any data in that first batch of blocks in any disk drive of the data storage system.

13. The computer program product of claim 12, wherein aggregating blocks into multiple batches includes placing together in one batch multiple blocks whose data are all directed to a same data object stored in the data storage system.

14. The computer program product of claim 13, wherein aggregating blocks into multiple batches further includes placing together in one batch multiple blocks whose data are all directed to a same range of logical addresses in the data object.

15. The computer program product of claim 13, wherein the method further comprises, when storing compressed data of a second batch in the set of non-volatile storage devices, providing the compressed data in a segment of contiguous storage space in a file system.

16. The computer program product of claim 15, wherein providing the compressed data in the segment of contiguous storage space in a file system includes updating a block pointer in the file system to point to the segment and to indicate in the block pointer that the block pointer points to compressed data.

* * * * *